United States Patent [19]

Jagodzinski et al.

[11] 4,419,337

[45] Dec. 6, 1983

[54] PROCESS AND APPARATUS FOR REACTING SULPHUR-CONTAINING MATERIAL WITH OXIDIZING GAS

[75] Inventors: Richard F. Jagodzinski; Richard K. Kerr, both of Calgary, Canada

[73] Assignees: Hudson's Bay Oil and Gas Company Limited; Alberta Energy Company Ltd., both of Alberta, Canada

[21] Appl. No.: 275,201

[22] Filed: Jun. 19, 1981

[30] Foreign Application Priority Data

Oct. 21, 1980 [CA] Canada ............................ 362841

[51] Int. Cl.³ ....................... C01B 17/04; B01D 53/34
[52] U.S. Cl. ............................... 423/574 R; 423/224; 423/535; 423/539; 423/573 R; 423/576; 422/190; 422/193
[58] Field of Search ............... 423/224, 573, 574, 576, 423/539, 535; 422/190, 191, 193

[56] References Cited

U.S. PATENT DOCUMENTS

| 1,317,583 | 9/1919 | Leamon ..................... 423/224 |
| 1,773,293 | 8/1930 | Benner ..................... 423/576 |
| 1,922,872 | 8/1933 | Thompson .................. 423/224 |
| 2,083,894 | 6/1937 | Connolly ................... 423/573 |
| 2,209,331 | 7/1940 | Maglund . |
| 2,758,913 | 8/1956 | Pearce . |
| 2,808,317 | 10/1957 | Schmalenbach et al. . |
| 3,978,137 | 8/1976 | Frame . |
| 4,088,743 | 5/1978 | Hass et al. . |
| 4,280,990 | 7/1981 | Jagodzinski ................ 423/574 |
| 4,314,983 | 2/1982 | Hass et al. ............... 423/573 X |

FOREIGN PATENT DOCUMENTS

| 157323 | 2/1952 | Australia .................. 423/573 |
| 374358 | 4/1923 | Fed. Rep. of Germany ...... 423/573 |
| 570521 | 12/1957 | Italy . |
| 3122 | of 1906 | United Kingdom ............ 423/573 |
| 867853 | 5/1961 | United Kingdom . |

OTHER PUBLICATIONS

Matt Steijns et al., "Catalytic Oxidation of Hydrogen Sulfide Influence of Pore Structure and Chemical Composition of Various Porous Substances", Ind. Eng. Chem., Prod. Res. Dev., vol. 16, No. 1, 1977, pp. 35–41.
"BSR/Selectox I Sulfur Recovery Process for Claus Tail Gas Treating", David K. Beavon et al. to be presented at The 5th Canadian Symposium on Catalysis, Oct. 26–27, 1977, Calgary, Alberta, pp. 75–87.

Primary Examiner—Earl C. Thomas
Attorney, Agent, or Firm—Kenway & Jenney

[57] ABSTRACT

Catalytic process for reacting a sulphur-containing material such as elemental sulphur or hydrogen sulphide with an oxygen-containing gas to produce sulphur dioxide. The process and apparatus can be used to remove hydrogen sulphide from a gas. The process and apparatus may also be used to produce sulphur dioxide as a product which may be converted to SO₃ and used, for example, to produce sulphuric acid.

19 Claims, 9 Drawing Figures

EFFECTIVENESS OF SOAKED CATALYST ON OXYGEN UTILIZATION (REACTOR TEMPERATURE = 300°C)

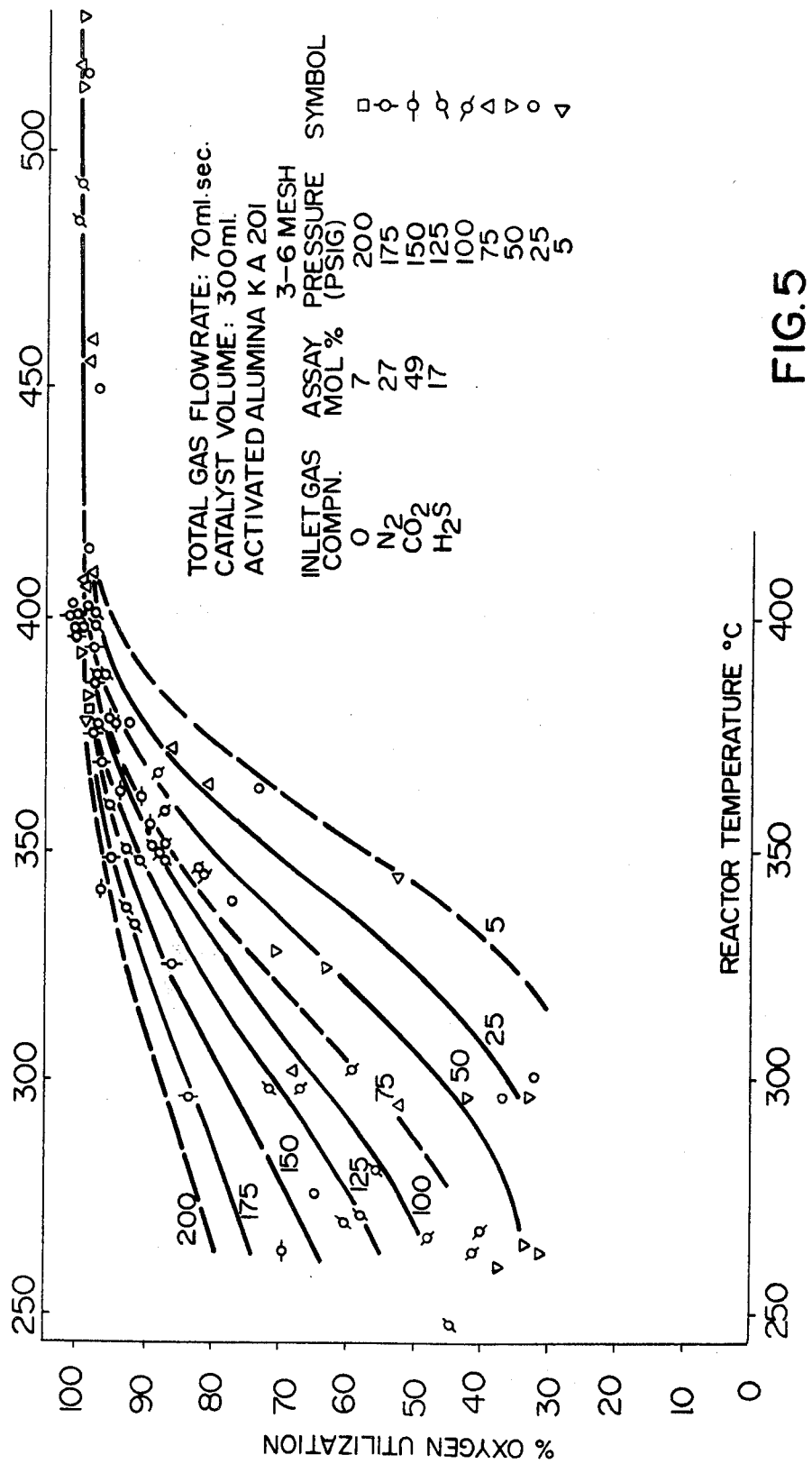

PROCESS AND APPARATUS FOR REACTING SULPHUR-CONTAINING MATERIAL WITH OXIDIZING GAS

INTRODUCTION

The present invention relates to a catalytic process for reacting hydrogen sulfide ($H_2S$) or elemental sulfur with air or oxygen. The invention is particularly advantageous for carrying out these reactions at elevated pressures or when using pure oxygen. Temperature in the catalyst bed may be controlled so that the reactor can be constructed of conventional metals without refractory lining.

The process is most useful as the first stage of a process for the production of sulfur from gas containing $H_2S$ by partial oxidation, for producing sulfur dioxide ($SO_2$) as a first stage in the production of sulfur trioxide or sulfuric acid from elemental sulfur, and for the production of both sulfur and carbon dioxide from lean acid gases.

DESCRIPTION OF PRIOR ART

The following are examples of prior art processes where the present invention can be used to great advantage:

(i) Conventional Sulfur Recovery from Acid Gases

Sour gas is a term applied to the products of gas wells which contain hydrogen sulfide; or to gas from industrial sources such as the hydrodesulfurization unit of an oil refinery.

Hydrogen sulfide ($H_2S$) must be removed from sour gas before such gases can be used or vented to the atmosphere, for environmental and safety reasons. Usually sour gas containing $H_2S$ is passed into an absorption unit wherein the $H_2S$ is absorbed in a liquid. The liquid is then regenerated in a separate vessel to produce a mixture of gases at about atmospheric pressure. This mixture of gases is termed an acid gas. It is a gas containing $H_2S$ which may also contain substantial quantities of carbon dioxide and lesser amounts of water vapour, methane, ammonia and other chemicals.

A conventional process for converting $H_2S$ in the acid gas to water vapour and sulfur is a process generally known as the Claus process. It is a low pressure process involving the following net reaction:

$$H_2S + \tfrac{1}{2}O_2 \rightarrow H_2O + S \quad (1)$$

This reaction is usually accomplished in two stages by a process known as the Modified Claus Process. First, a portion of the $H_2S$ in the acid gas stream is reacted with air in a free-flame combustion furnace, as follows:

$$\tfrac{1}{3}H_2S + \tfrac{1}{2}O_2 \rightarrow \tfrac{1}{3}SO_2 + \tfrac{1}{3}H_2O \quad (2)$$

The remaining $H_2S$ is then reacted with the $SO_2$ produced in the furnace in a catalytic reactor, with a suitable catalyst such as activated alumina, as follows:

$$\tfrac{2}{3}H_2S + \tfrac{1}{3}SO_2 \rightleftharpoons \tfrac{2}{3}H_2O + (1/n)S_n \quad (3)$$
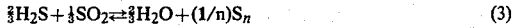

where $S_n$ is a complex molecular mixture of elemental sulfur vapour and n (the average number of atoms in a molecule) usually has a value of between 7 and 8 for conditions in the catalytic reactor. Conditions are maintained in the catalytic reactor so that temperatures never fall below the dewpoint of sulfur vapour and sulfur is prevented from condensing and plugging the catalyst. Sulfur is condensed and removed in a separate vessel and the process gases ($H_2S$ and $SO_2$) are reheated for further catalytic stages. Production of sulfur by reaction (3) is favored by a reduction of temperature.

Both reactions (2) and (3) occur to some extent in the combustion furnace and both reactions are exothermic. However, the first stage of the process (reaction (2)) is a free flame combustion which requires high temperatures for initiation and complete oxygen utilization. Flame temperatures can be as high as 1350° C. but are normally between about 900° and 1250° C.

The fact that the temperature in the furnace must be high, and the fact that large amounts of heat are produced give rise to practical problems in the construction of a suitable furnace and waste heat boiler; i.e. refractory insulation in the furnace and the boiler as well as the use of alloy steels are required. Also, the conventional process requires a minimum proportion of $H_2S$ in the gas at about 40 percent by volume, below which combustion is not self-supporting.

In certain prior art processes, a catalyst has been used to carry out reaction (2). Catalyst use is particularly advantageous for non-ignitable acid gases (i.e. with less than 40% $H_2S$). However, since the temperatures and oxygen levels are high, the catalyst is subject to sintering, phase changes and sulfate formation, which poison the catalyst and lower its activity. The temperature is always maintained above the sulfur dewpoint, since condensation of sulfur on the catalyst is known to inhibit the reactions due to catalyst pore blockage. Commercial processes using this vapour phase catalytic furnace have been unsuccessful.

The conventional Claus process is operated at near atmospheric pressure. Although the benefits of pressure on process yields are evident from equation (3), the necessity of maintaining super-dewpoint operation requires increased temperatures in the catalytic reactors which decrease process yields. The net effect of increased pressure and increased temperature is decreased yields, and consequently operation of a Claus plant at elevated pressures has not been practised commercially.

Elevated pressure operation of Clause reaction furnace also poses some difficulty. High temperature gases must be contained, at pressure, by a refractory lined vessel. Added to this difficulty is the risk of loss of flame and the subsequent accumulation of explosive gas mixtures.

In addition, some prior art processes for removing $H_2S$ from gas mixtures have used low temperature catalyst beds in which sulfur may be produced as a liquid. However, these have not been widely used because the rate of reaction is low.

(ii) Sulfur Recovery from Lean Acid Gases

A lean acid gas is an acid gas that contains a substantial amount of $CO_2$, usually greater than about 60 percent, so that the acid gas cannot sustain a free flame in a Claus process furnace. For proper stoichiometry only $\tfrac{1}{3}$ of the $H_2S$ need be combusted to form $SO_2$. In practice, there are several approaches to solve this problem, namely:

(a) Preheat the acid gas and/or air to increase flame temperatures in the furnace.

(b) Add and combust a gas such as methane in the same furnace to increase temperatures.

(c) By-pass a portion of the acid gas around the furnace (⅔ maximum) to increase furnace flame temperatures.

(d) By-pass an acid gas furnace altogether by burning a portion of product sulfur to produce $SO_2$ in a sulfur burner, co-mixing the $SO_2$ with acid gas and injecting the mixture to the catalytic section of a conventional Claus plant.

For very lean acid gases (less than about 15% $H_2S$) only methods (b) and (d) are possible. In practice each (or a combination) of these methods has had limited success. Problems associated with the methods are as follows:

(e) It is important for continuing activity of catalyst in the conventional Claus and associated processes, that no $SO_3$ be formed in the furnace and that no molecular oxygen be present in the furnace effluent gases. The $SO_3$ and/or $O_2$ will form sulfates and poison Claus catalyst so that it becomes inactive to promote reaction (3). Methods (b), (c), and (d) above all have the disadvantage of increasing the possibility of $SO_3$ production and/or oxygen break-through to downstream catalytic reactors.

(f) Methods (a), (b), and (c) above all suffer one flaw. Flame temperatures are low and the risk of oxygen break-through to downstream catalyst is significant. Method (c) (partial acid gas by-pass) suffers the additional problem of decreasing reductant concentratins ($H_2S$) in the furnace so that $SO_3$ formation is also more likely.

(g) The $SO_3$ formation can also lead to the formation of solid sulfates in the condenser sections of the Clause plant. These sulfates can either plug condensers or plug sulfur burner nozzles when recycled to a burner (as in (d)).

(h) In a sulfur-burner recycle system described above (d), about one-third of the sulfur to the process comes from recycled sulfur. Thus, the plant capacity to treat acid gas is reduced by ⅓ compared with direct acid combustion methods. In order to try to minimize some of the above problems and to reduce high sulfur-burner flame temperatures, sulfur is normally combusted with air in an atmosphere of excess sulfur. The excess sulfur is passed downstream as sulfur vapour which must be removed or it will inhibit reaction (3). Because of mixing limitations with the sulfur flame, this approach is not always successful.

(iii) Sulfur and Carbon Dioxide Recovery from Acid Gas

If pure oxygen (or substantially-pure oxygen) is used in a process to carry out reactions (2) and (3), the tail gas from the process would contain $CO_2$ (from the acid gas) and water vapour with only small amounts of unreacted $H_2S$ and $SO_2$ and other trace components. Carbon dioxide could be recovered by simply condensing and removing the water vapour in the tail gas.

However, a conventional Claus process cannot conveniently use oxygen rather than air in its combustion furnace. For rich acid gases the nitrogen in air is necessary to quench flame temperatures to manageable levels. For example, for a 100% $H_2S$ acid gas, flame temperatures to carry out reaction (2) only combusting ⅓ of the acid gas in pure oxygen are about 3200° C. Gases at such temperatures cannot be contained within conventional refractory vessels. A lean acid gas; for example 25% $H_2S$, 75% $CO_2$, would have a flame temperature of about 1000° C. This is about the minimum temperature to sustain a free flame. Acid gases with less $H_2S$ would have to use some of the techniques mentioned previously. Lean acid gases, containing significant amounts of $CO_2$, have the largest incentive for $CO_2$ recovery.

(iv) Sulfuric Acid

The present invention can also be used to react oxygen or oxygen containing gases with elemental sulfur to produce sulfur dioxide gas (reaction 3A) and may be useful for such processes described herein and following:

$$S + O_2 \rightarrow SO_2 \tag{3A}$$

Sulfur dioxide gas is used to produce sulfuric acid by further reaction with oxygen as follows:

$$SO_2 + \tfrac{1}{2}O_2 \rightleftharpoons SO_3 \tag{4}$$

$$SO_3 + H_2O \rightleftharpoons H_2SO_4 \tag{5}$$

Reaction (4) is an exothermic equilibrium reaction favored by low temperatures. It is normally conducted in several catalytic stages with heat removal at the end of each stage. Reaction (5) is also exothermic and heavily favored at temperatures below about 500° C. Obviously, by Le Chatelier's principle, $SO_3$ production is favored by high pressure operation, or by pure oxygen utilization (rather than air)

To date, production of $SO_2$ at pressure has been limited by conventional equipment capabilities. A stoichiometric sulfur flame has an adiabatic flame temperature of about 1800° C. in air of 5300° C. in pure $O_2$. If excess oxygen suitable for reaction (4) is included, flame temperatures are about 1300° C. in air and 4050° C. in pure oxygen. Sulfur-oxygen flame temperatures are too high for use in a conventional furnace. Air-sulfur flames either must be contained in a refractory-lined vessel or flame temperatures must be quenched by the addition of either excess air or sulfur to the combustion chamber. In the former case, (of excess air), the excess gas must be contained and processed in down-stream equipment. In the latter case, the excess sulfur is carried downstream as a vapour and is removed in a waste-heat boiler/sulfur condenser. In any case, the heat from the sulfur flame is removed in a separate waste heat recovery boiler.

Operation at elevated pressures is complicated by the necessity to contain high temperature gases in a refractory lined vessel. Added to these difficulties is the risk of loss of flame and the subsequent build up of explosive gas mixture.

(v) Sulfur Trioxide

Pyrosulfuric acid or oleum is rapidly becoming an important industrial chemical. It has the obvious advantages over sulfuric acid in that it reduces the transportation costs associated with water (compare reactions (4) and (5)).

Oleum is normally produced by absorbing $SO_3$ with concentrated $H_2SO_4$. Limited partial pressures of $SO_3$ (diluted by $N_2$) in a conventional sulfuric acid plant inhibit this absorption. In comparison, a pressurized process or a process using pure $O_2$ rather than air could allow more efficient absorption or even direct condensation of $SO_3$, because of the higher $SO_3$ partial pressure.

SUMMARY OF THE PRESENT INVENTION

When included as a step or stage in the foregoing processes, the present invention reduces many of the drawbacks associated with the prior art processes. The present invention is a process in which $H_2S$ or elemental sulfur and a gas containing free oxygen are continuously introduced into a reactor having a bed of solid catalyst that is maintained continuously completely saturated with liquid sulfur. Hydrogen sulfide is reacted according to reactions (2) and (3); elemental sulfur is oxidized to produce $SO_2$ (reaction (3A)). The temperature within the catalyst bed is controlled to be between about 300° C. and 550° C. except for $H_2S$ reactions at pressures higher than atmospheric in which case the lower limit temperature can be significantly reduced. The range of temperatures (which is between 275° C. and 550° C.) includes temperatures higher than those previously used in cases where sulfur is produced as a liquid but lower than those found in a free-flame furnace. As a result of low temperatures and flameless operation, it is possible to use standard (non-refractory) construction materials. More importantly, contrary to expectations based on previous experience for catalytic $H_2S$ furnaces, it has been found that when the catalyst is saturated or soaked with liquid sulfur, it does not lose its catalytic activity, as it is protected from sulfation, sintering and phase changes by the liquid sulfur. Soaked catalyst and excess amounts of liquid sulfur also inhibits the formation of $SO_3$ by converting any $SO_3$ to $SO_2$ via reaction (6):

$$S + 2SO_3 \rightarrow 3SO_2 \qquad (6)$$

It has also been found that liquid sulfur itself provides a medium for reactions (2), (3), and (4) to occur, but that it is not as effective as a liquid soaked catalyst especially at lower reactor temperatures.

The liquid sulfur also provides a convenient and effective means for cooling the catalyst bed and provides the means for allowing the reactions to take place at optimum temperatures and which are such that the reaction vessels can be formed from metals without refractory lining. The use of liquid sulfur as a coolant allows the reactions and heat recovery to proceed in the same vessel at the same time.

Furthermore, the process can conveniently be operated at elevated pressures with attendant advantages therein. In the case of $H_2S$, it has been found that the process is more effective at higher pressures, especially above 5 atmospheres absolute; preferred pressures are between 5 and 50 atmospheres absolute. Since the boiling point of sulfur is 444.6° C. and this temperature is included within the preferred range (300° C. to 550° C.), pressures above atmospheric may be necessary to ensure the presence of liquid sulfur in the reactor and to ensure catalyst saturation with liquid sulfur.

Furthermore, the present invention can use substantially pure oxygen or enriched air, rather than air, as a source of oxygen without affecting the temperature in the reaction vessel.

The $H_2S$ may be contained in an acid gas introduced into the reactor, and which preferably has more than 1% $H_2S$ (v/v).

BRIEF DESCRIPTION OF THE DRAWINGS

FIG. 5 depicts the following graphically for the present invention for $H_2S$ reactions: (a) soaked catalyst can effect oxygen utiliziation according to either reactions (2) or (3A); increasing efficiency in oxygen utilization with increasing temperatue; (c) a minimum temperature above which complete oxygen utilization is achieved and (d) higher utilization with higher pressure at the same temperature;

DESCRIPTION OF THE PREFERRED EMBODIMENTS

Examples of the foregoing processes, as improved by utilizing the present invention as a stage or step, are given below.

(i) Sulfur Recovery from Acid Gas

The discovery that, given suitable operating conditions, a catalyst retains its activity for promoting reactions between sulfur compounds and other compounds, specifically hydrogen sulfide and/or elemental sulfur and oxygen, when soaked with liquid sulfur, is unexpected. It also provides the basis for the invention described in our U.S. Pat. No. 4,280,990. This latter invention is concerned with the second step of the conventional Claus process in which $H_2S$ and $SO_2$ react to produce sulfur (reaction (3). The process of the present invention when used in the oxidation of $H_2S$ can conveniently be used to replace the first, furnace stage of a conventional Claus plant, for reaction (2), while the process described in U.S. Pat. No. 4,280,990 replaces the second or catalytic stage of such a plant (reaction (3)). In the latter invention, a supply of sulfur is provided which can be circulated to the present invention for temperature control. In fact, it is preferred that there be an interchange of liquid sulfur between the two.

Preferably a bubble or a trickle-bed reactor with fixed catalyst bed will be used for the present invention; however a slurry reactor, which is a bubble reactor where the catalyst is unconstrained by screens, may also be used. Cooling may be provided directly by regulating the amount of cooled liquid sulfur to the bed or indirectly by placing cooling coils in or around the catalyst bed. In either case, if necessary, liquid sulfur is injected onto the catalyst bed to maintain all of the catalyst continuously soaked with sulfur liquid. In the case of a bubble reactor liquid sulfur inflows are regulated to maintain the catalyst submerged in liquid sulfur.

Figure 1:
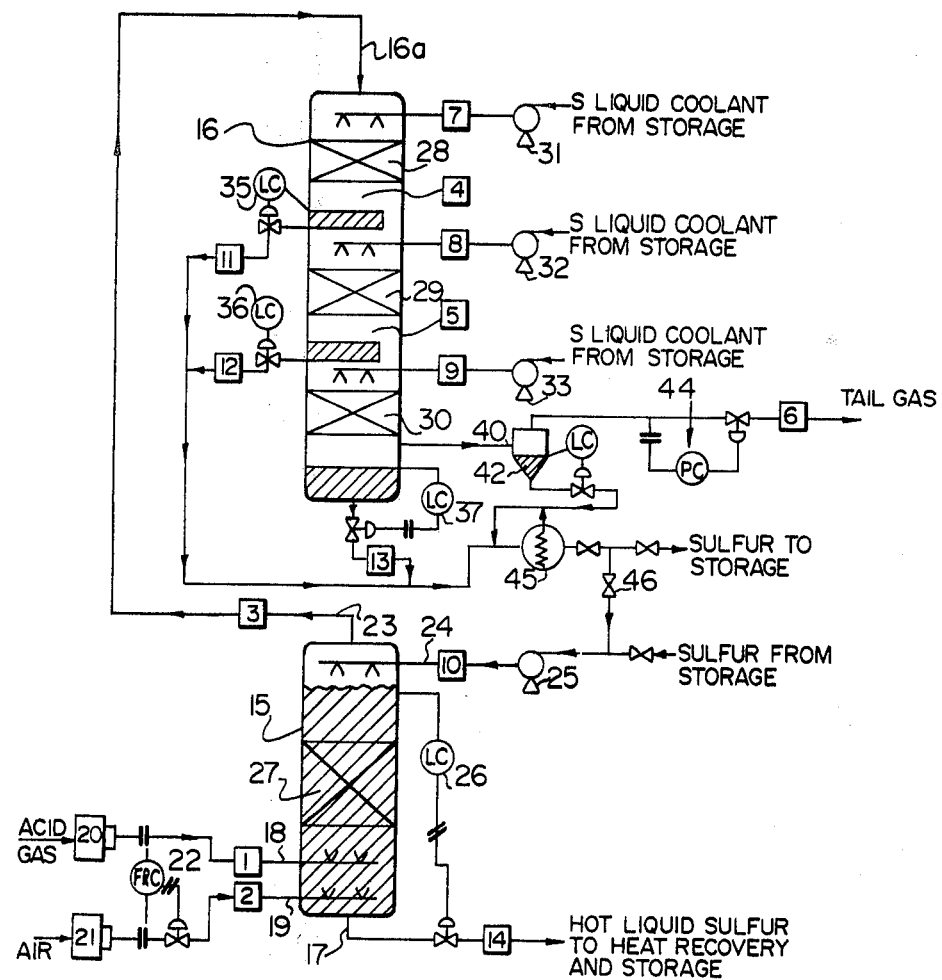
FIG. 1 is a schematic diagram of a bubble reactor of the present invention used in association with the apparatus described in our U.S. Pat. No. 4,280,990 issed July 28, 1981 for recovering sulfur from acid gas.

Referring to FIG. 1, the furnace reactor is a bubble reactor vessel 15 in the form of a cylinder containing a fixed bed 27 of solid catalyst held in place by screens. Since the temperature within this vessel will be less than about 550° C., the vessel can be made of metal without refractory lining. The vessel has a bottom outlet 17 for hot liquid sulfur, (stream 14) and bottom inlets 18 and 19 respectively for acid gas and compressed air (streams 1 and 2). Acid gas and air are compressed by compressors 20 and 21 to a pressure of about 10 atm. absolute. The ratio of air to acid gas flow is controlled by flow ratio controller 22 so that the effluent gases leavng the reactor contain $H_2S$ and $SO_2$ in the ratio of 2:1 by volume and are thus in correct stoichiometry for reaction (3). The reactor vessel has a top exit 23 for reacted gases 3 and a top inlet 24 for cooling sulfur 10 provided by sulfur pump 25. The level of liquid sulfur in the reactor is controlled by level controller 26 to maintain all the catalyst soaked and submerged in liquid sulfur. The temperature of the reactor is controlled by the coolant sulfur flow, 10.

In operation, as initial quantity of hot liquid sulfur is introduced into the reactor via pipe 24, this being sufficient to completely soak and immerse the catalyst, to heat the catalyst to about 300° C., and to form a liquid layer in the reactor reaching up to a level higher than the top of the catalyst bed. If necessary an external heat source may be provided to heat the submerged catalyst to about 300° C. Then controlled quantities of $H_2S$ and air are introducing into the reactor via pipes 18 and 19, bubbling up through the liquid sulfur and catalyst while reacting. The temperature of the liquid sulfur initially introduced is sufficient to start the reaction. The reaction temperature rises to about 390° C. from the heat of the reaction. Some or all of reactions (2), (3), and (3A) occur within the catalyst bed in the reactor.

Although it is difficult to determine which reactions are occurring at which stage, it is known from experiments that the overall reactions will result in production of sulfur and consumption of oxygen. Consumption of oxygen is the key parameter in the evaluation of the performance of the reactor.

The reacted gases (stream 3), saturated in sulfur vapour and containing stoichiometric amounts of $H_2S$ and $SO_2$ for reaction (3) pass to the top 16a of reactor 16, which is similar to that described in our U.S. Pat. No. 4,280,990, and reference is made to this earlier application for further details. Reactor 16 contains 3 catalyst beds 28, 29, and 30 with means for cooling each independently provided by pumps 31, 32 and 33 which supply liquid sulfur streams 7, 8 and 9 to the tops of the bed. Level controllers 35, 36, and 37 control the removal of the heated coolant liquid sulfur and the product sulfur in streams 11, 12 and 13 so that no gas is removed with the liquid. The process gases are cooled and reacted in each of the 3 successive stages and exit the reactor in line 40. Any sulfur liquid mist present in the tail gas is removed by centrifugal scrubber 42. The pressure in the process vessels is controlled by pressure controller 44. Tail gas (stream 6) can then be further treated or incinerated and vented to the atmosphere. The sulfur in streams 11, 12, 13 and from the centrifugal scrubber 42 passes through a trim cooler 45. The valve arrangement 46, allows the cooled sulfur to be recycled to reactor 15 or to be sent to storage. The process as shown in FIG. 1 can be used to recover sulfur from both lean and rich acid gases.

Table 1 presents a material and energy balance for such a plant treating an acid gas containing 75% $H_2S$, 25% $CO_2$ (dry basis) with an inlet sulfur capacity of 500 LTD. The stream codes and reactor stage in Table 1 are keyed to the process streams in FIG. 1.

Table 2 presents a material and energy balance for such a plant processing a lean acid gas 25% $H_2S$, 75% $CO_2$ (dry).

TABLE 1

MATERIAL/ENERGY BALANCES
(75% $H_2S$ Case)

PROCESS GAS STREAMS

| STREAM KEY | ACID GAS 1 | AIR 2 | FURNACE O/L 3 | 1ST STAGE REACTOR O/L 4 | 2ND STAGE REACTOR O/L 5 | TAIL GAS 6 |
|---|---|---|---|---|---|---|
| AND REACTOR STAGE TEMP (°C.) | 127 | 127 | 375 | 275 | 225 | 175 |
| FLOWS (KG-MOL/HR) | | | | | | |
| $H_2S$ | 1.3230 | — | 0.1131 | 0.0284 | 0.0110 | 0.0034 |
| $SO_2$ | — | — | 0.0566 | 0.0142 | 0.0055 | 0.0017 |
| $N_2$ | — | 2.4890 | 2.4890 | 2.4890 | 2.4890 | 2.4890 |
| $CO_2$ | 0.4410 | — | 0.4410 | 0.4410 | 0.4410 | 0.4410 |
| $O_2$ | — | 0.6615 | — | — | — | — |
| $H_2O$ | 0.0176 | 0.0759 | 1.3033 | 1.3881 | 1.4054 | 1.4131 |
| $S_1$ (VAPOUR) | — | — | 1.0711 | 0.1285 | 0.0270 | 0.0033 |
| TOTAL | 1.7816 | 3.2264 | 5.4741 | 4.4892 | 4.3789 | 4.3515 |
| PERFORMANCE | | | | | | |
| % Conversion | 0 | 0 | 87.17% | 96.78% | 98.75% | 99.62% |
| % Recovery | 0 | 0 | 5.72% | 87.06% | 96.71% | 99.37% |
| ENTHALPY (KG-CAL/HR) ($\times 10^{-3}$) | −47.312 | −2.075 | −103.232 | −110.983 | −113.813 | −116.319 |

PROCESS LIQUID SULFUR STREAMS

| | 1st Stage | 2nd Stage | 3rd Stage | 1st Stage Reactor | 2nd Stage Reactor | 3rd Stage Reactor | Furnace |
|---|---|---|---|---|---|---|---|

TABLE 1-continued

MATERIAL/ENERGY BALANCES
(75% H$_2$S Case)

| | | Reactor Coolant 7 | Reactor Coolant 8 | Reactor Coolant 9 | Furnace Coolant 10 | Heat Removal 11 | Heat Removal 12 | Heat Removal 13 | Heat Removal 14 |
|---|---|---|---|---|---|---|---|---|---|
| | FLOW S$_1$ (KG-MOL/HR) | 0.7213 | 0.3938 | 0.7296 | 3.0777 | 1.7974 | 0.5215 | 0.7648 | 3.1534 |
| | TEMP (°C.) | 132 | 132 | 132 | 132 | 275 | 225 | 175 | 375 |
| | HEAT REMOVED (KG-CAL/HR) ($\times 10^{-3}$) | — | — | — | — | 7.751 | 2.830 | 2.506 | 53.843 |

TABLE 2

MATERIAL/ENERGY BALANCES
(25% H$_2$S Case)

PROCESS GAS STREAMS

| | ACID GAS 1 | AIR 2 | FURNACE O/L 3 | 1ST STAGE REACTOR O/L 4 | 2ND STAGE REACTOR O/L 5 | TAIL GAS 6 |
|---|---|---|---|---|---|---|
| TEMP (°C.) | 127 | 127 | 375 | 275 | 225 | 175 |
| FLOWS (KG-MOL/HR) | | | | | | |
| H$_2$S | 1.3230 | — | 0.1409 | 0.0353 | 0.0138 | 0.0042 |
| SO$_2$ | — | — | 0.0705 | 0.0176 | 0.0069 | 0.0021 |
| N$_2$ | — | 2.4872 | 2.4872 | 2.4872 | 2.4872 | 2.4872 |
| CO$_2$ | 3.9690 | — | 3.9690 | 3.9690 | 3.9690 | 3.9690 |
| O$_2$ | — | 0.6615 | — | — | — | — |
| H$_2$O | 0.0564 | 0.0759 | 1.3165 | 1.4200 | 1.4415 | 1.4511 |
| S$_1$ (VAPOUR) | — | — | 1.9415 | 0.2337 | 0.0491 | 0.0060 |
| TOTAL | 5.3484 | 3.2246 | 9.9256 | 8.1628 | 7.9675 | 7.9196 |
| PERFORMANCE | | | | | | |
| % Conversion | — | — | +84.23% | 96.00% | 98.44% | 99.53% |
| % Recovery | — | — | −63.45% | 78.31% | 94.73% | 99.07% |
| ENTHALPY (KG-CAL/HR $\times 10^{-3}$) | −377.960 | −2.080 | −419.421 | −438.331 | −443.275 | −447.208 |

PROCESS LIQUID SULFUR STREAMS

| | 1st Stage Reactor Coolant 7 | 2nd Stage Reactor Coolant 8 | 3rd Stage Reactor Coolant 9 | Furnace Coolant 10 | 1st Stage Reactor Heat Removal 11 | 2nd Stage Reactor Heat Removal 12 | 3rd Stage Reactor Heat Removal 13 | Furnace Heat Removal 14 |
|---|---|---|---|---|---|---|---|---|
| FLOW S$_1$ (KG-MOL/HR) | 1.7598 | 0.6880 | 1.1450 | 2.7985 | 3.6353 | 0.9052 | 1.2024 | 2.1800 |
| TEMP (°C.) | 132 | 132 | 132 | 132 | 275 | 225 | 175 | 375 |
| HEAT REMOVED (KG-CAL/HR $\times 10^{-3}$) | — | — | — | — | 18.910 | 4.944 | 3.933 | 48.959 |

(ii) Sulfur and CO$_2$ Recovery from Acid Gas

Figure 2:
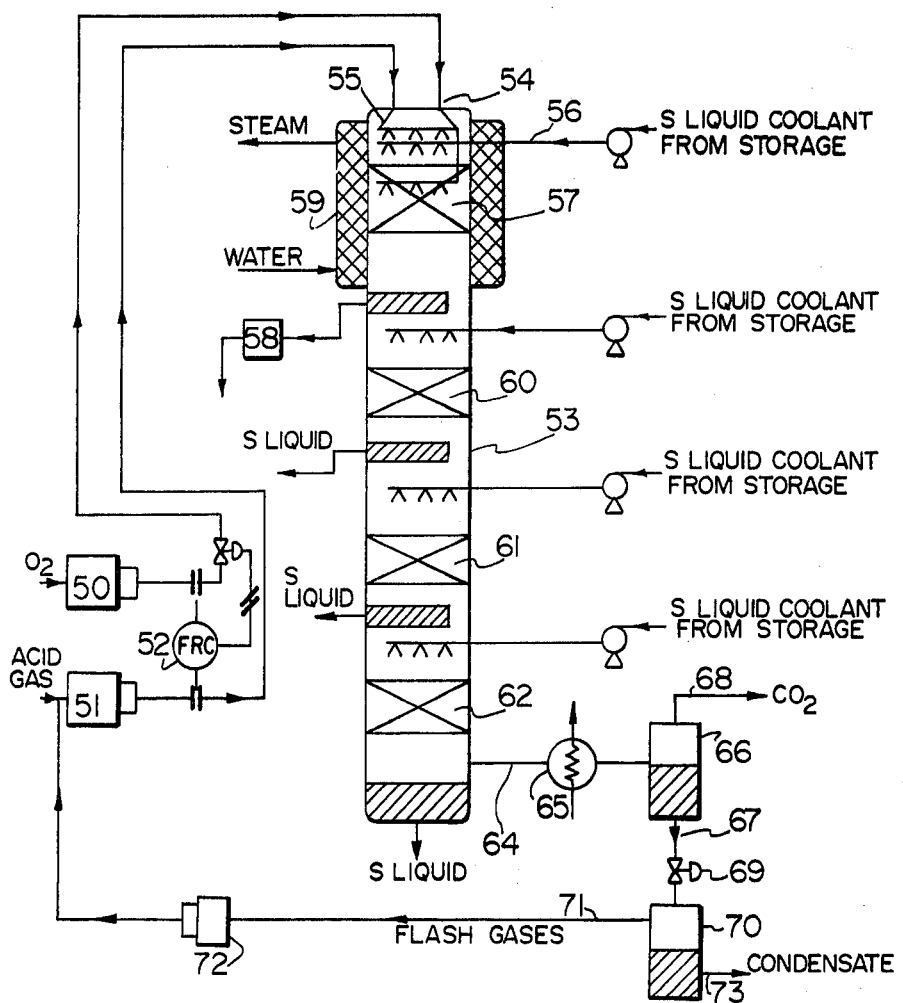
FIG. 2 is a schematic diagram of a trickle bed reactor of the present invention combined with apparatus described in U.S. Pat. No. 4,280,990 for recovering sulfur and carbon dioxide from a lean acid gas.

A second embodiment of the invention is shown in FIG. 2, in which a reactor for producing H$_2$S and SO$_2$ from H$_2$S and oxygen (or air) is in the form of a trickle-bed reactor and is contained in the top part of a vessel also having a second reactor for producing sulfur from H$_2$S and SO$_2$ in accordance with aforesaid U.S. Pat. No. 4,280,990.

Oxygen and acid gas are compressed by compressors 50 and 51. The flow of oxygen is controlled by flow ratio controller 52 to maintain process stoichiometry such that the proportions of H$_2$S and SO$_2$ passing into the second reactor are in a ratio of 2:1 by volume. Vessel 53 is a single vertical, cylindrical process vessel to carry out reactions (2) and (3). Oxygen, and acid gas enter at the top at 54 and 55. The acid gas is preferbly a lean acid gas with H$_2$S content between about 1 and 40%, the remaining major constituent being CO$_2$. Coolant sulfur is added at 56 to maintain all the catalyst continuously soaked with sulfur. A catalyst, for example, vanadium pentoxide, is held in place to form a bed 57 retained by suitable screens. Gases and liquid sulfur pass co-currently downward through the catalyst bed. Heat is removed both by hot liquid sulfur leaving as stream 58 and by a steam jacket 59 around the catalyst bed. The gases then pass through 3 successive catalytic stages 60, 61, 62 with flow arrangements similar to those in FIG. 1, and these stages are operated as described in U.S. Pat. No. 4,280,990 to produce H$_2$O and liquid sulfur. (For the purpose of simplicity, sulfur coolant and drawdown flows and controls are omitted). The tail gases exit from the reactor at 64, pass through a cooler/condenser 65 and into a phase separator 66. The water and sulfur that condense from the tail gas, are removed from phase separator 66 as condensate stream 67. This condensate is passed through valve 69 to reduce pressure to substantially atmospheric and passes into flash tank 70. Gases flashed from the condensate are passed through line 71 and compressor 72 to be recycled through acid gas compressor 51. Condensate from the flash tank is removed in line 73 for further treatment or disposal, as necessary. The tail gas 68 is now substantially pure $CO_2$.

(iii) Sulfur Trioxide/Dioxide Production

Figure 3:
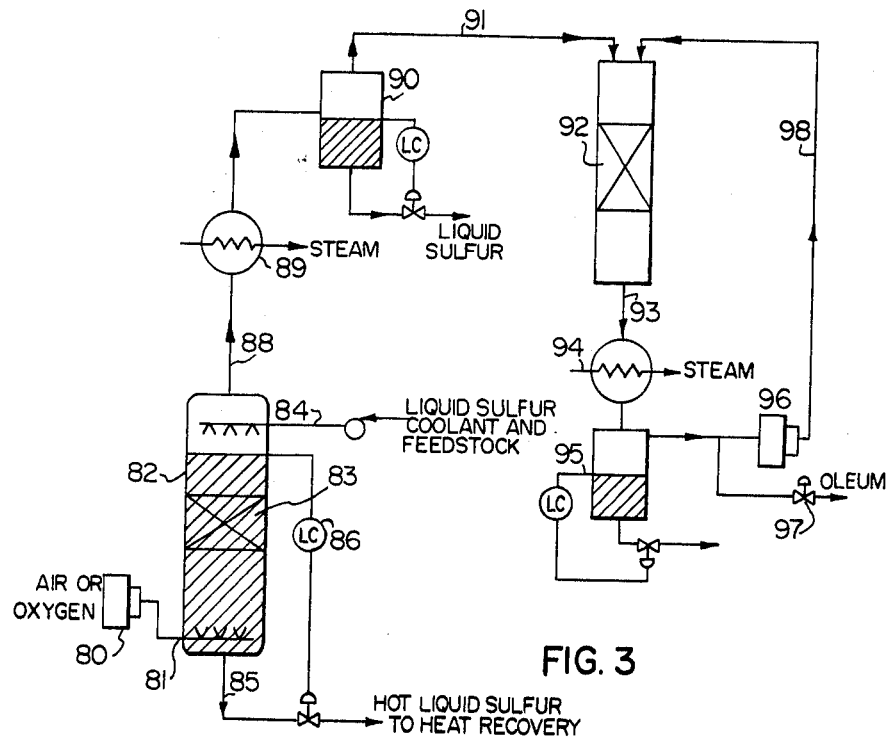
FIG. 3 is a schematic diagram of a reactor in accordance with the invention to produce $SO_2$ from elemental sulfur and includes a further reactor for converting the $SO_2$ to $SO_3$.

FIG. 3 depicts a third preferred embodiment of our invention—a catalytic furnace/sulfur condenser to produce $SO_2$ uncontaminated with $SO_3$ and a process to further react said $SO_2$ with unreacted oxygen to produce $SO_3$. Air or pure oxygen is compressed by compressor 80 to enter reactor 82 at inlet 81. The air or oxygen bubbles up through catalyst bed 83 containing, for example, vanadium pentoxide catalyst, and reacts with liquid sulfur to produce sulfur dioxide. Liquid sulfur enters the top of the reactor at 84, the sulfur beng provided both as a coolant to control reactor temperatures at about 400° C., and as a feedstock for oxidation to $SO_2$. Hot liquid sulfur is removed from the reactor at 85. Level controller 86 controls sulfur removal to maintain a level of liquid sulfur in the reactor above the top of catalyst bed 83. Gases exit the reactor by line 88. The gases contain $SO_2$, $N_2$ (if air is used in compresser 80) and unreacted $O_2$ (if desired) and are saturated in sulfur vapour. The presence of liquid sulfur in the reactor is sufficient to prevent the formation of $SO_3$.

The exit gases in line 88 are fed into a cooler 89 which cools the gases to condense substantially all of the sulfur vapour to sulfur liquid. The liquid is collected and removed in phase separator 90. Gases exit phase separator 90 in line 91 and contain $SO_2$, $N_2$ (if air is used in compressor 80) and unreacted $O_2$ (if desired). If pure oxygen is used and all the oxygen is substantially reacted in reactor 82, line 91 would contain substantially pure $SO_2$, uncontaminated with $SO_3$.

For the purpose of production of $SO_3$, the air or oxygen flow to reactor 82 and the temperature in reactor 82 are controlled to only partially react the oxygen in reactor 82 to supply stoichiometric amounts of $SO_2$ and $O_2$ for $SO_3$ production. Even with partial reaction of the oxygen, the presence of liquid sulfur in reactor 82 is sufficient to inhibit $SO_3$ formation in this vessel. In this case, line 91 contains $SO_2$, $N_2$ (if desired) and unreacted $O_2$. These gases are passed to a conventional catalytic reactor 92 which has a catalyst which causes the $SO_2$ to react with the oxygen to produce $SO_3$. This reactor may be cooled to cause the reaction between $SO_2$ and oxygen to go to near completion, and the gases supplied to reactor 92 may have a pressure greater than 5 atm. absolute.

If $O_2$ is used, line 91 contains $SO_2$ and unreacted $O_2$ and the products from reactor 92 in line 93 would contain $SO_3$ and unreacted $SO_2$ and $O_2$. The gases would pass through cooler 94 to condense some or all of the $SO_3$ which would be removed in phase separator 95. Gases from this phase separator would either be vented through vent line 97 or recycled by compressor 96 through line 98 to reactor 92.

Figure 3A:
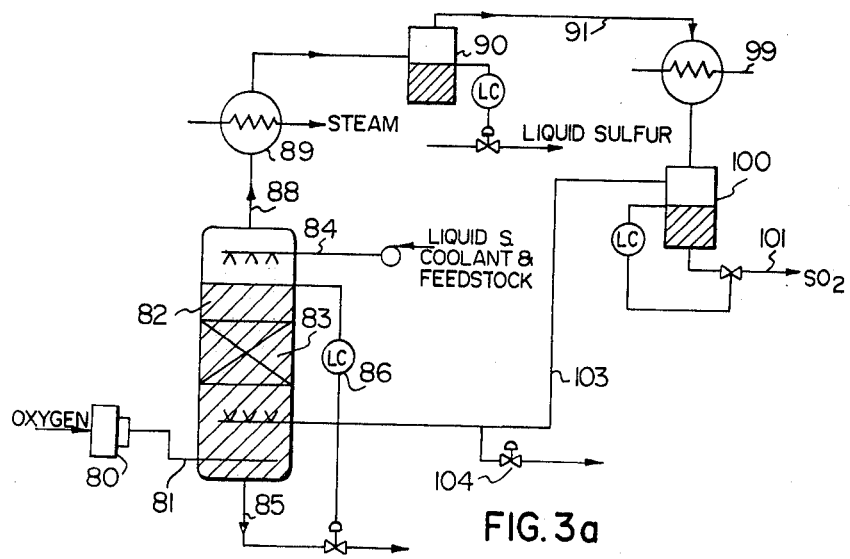
FIG. 3a shows a variation of the system of FIG. 3 where the final product is $SO_2$.

FIG. 3a shows a variation of the apparatus of FIG. 3 to be used when $SO_2$ is the desired product. The apparatus up to line 91 is the same as that of FIG. 3 and corresponding parts have the same reference numerals. Pure oxygen is used as the feedstock so that line 91 contains substantially pure $SO_2$; this is condensed in condenser 99 and removed by separator 100 in line 101. The residual gases after removal of $SO_2$ pass via line 103 either back to reactor 82 for further processing, or may be purged through valve 104.

V. EXPERIMENTAL RESULTS

Figure 4:
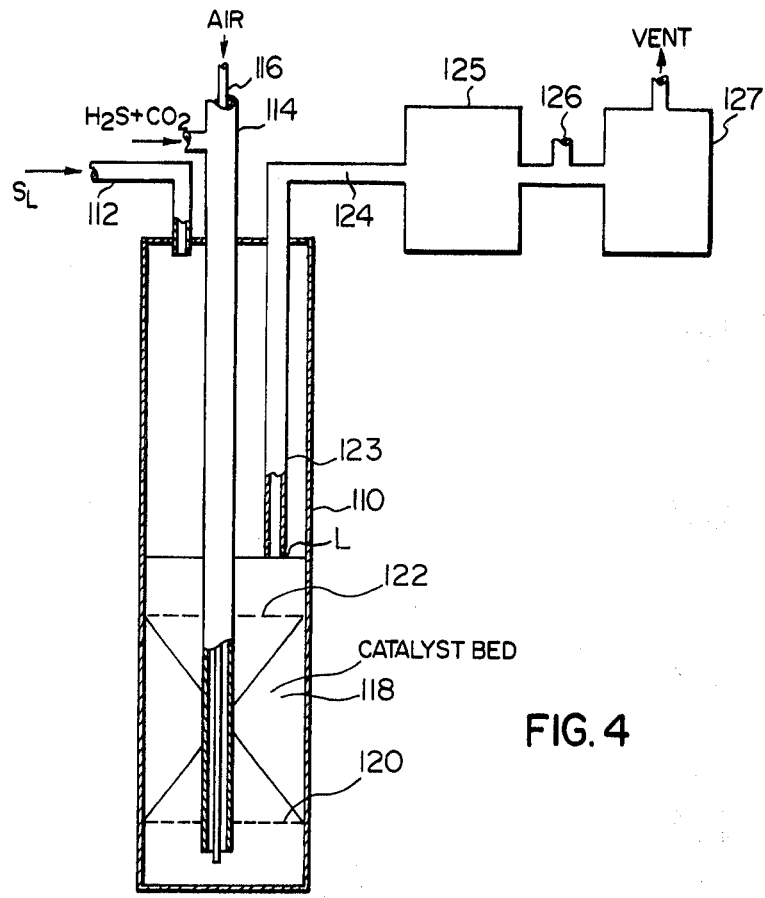
FIG. 4 is a sectional view of a laboratory reactor used to demonstrate the catalytic activity of liquid sulfur soaked catalyst under the conditions specified in the invention.

FIG. 4 is a sectional drawing of the apparatus used in the experiments to demonstrate the effectiveness of catalyst when soaked with liquid sulfur. The apparatus includes a cylindrical vessel 110 having a top inlet 112 for liquid sulfur, and an inlet pipe arrangement including an outer pipe 114 connected to a source of acid gas, and an inner pipe 116 which is connected to a source of air or oxygen. Both of these pipes pass through a catalyst bed 118 held between screens 120 and 122, and terminate at a point fairly close to the bottom of the vessel. A stand pipe 123 leads from above screen 122 to a gas outlet 124 having a device 125 for sulfur vapour condensation, a sample port 126, and a scrubber 127. Liquid sulfur was injected through line 112 and reactor sulfur level was controlled by the stand pipe 123 to be at level L above the top screen 122 of the catalyst bed.

The reactor was filled with 300 ml of $3 \times 6$ mesh KA-201 activated alumina catalyst and the reactor volume to the top of the liquid sulfur was about 700 ml. Means for heating the vessel and regulating its temperature were also provided.

A series of experiments was performed with this apparatus using a mixture of $CO_2$ and $H_2S$, or $CO_2$ alone injected through tube 114 and with air or oxygen introduced through tube 116. Two cases were studied: Case 1 to simulate reaction (2) for oxidizing $H_2S$ and Case 2 to simulate an oxidation furnace to produce $SO_2$ for a sulfuric acid plant. In the latter case $CO_2$ was used as a diluent gas and to facilitate gas chromatographic analyses. Table 3 presents the composite inlet gas compositions and flows for the experiments.

TABLE 3

| Reactor Composite Inlet Gas Compositions (mole %) | | |
|---|---|---|
| | Case 1 | Case 2 |
| $O_2$ | 7 | 8.5 |
| $N_2$ | 27 | 32.5 |
| $CO_2$ | 49 | 59.0 |
| $H_2S$ | 17 | — |
| Gas Flow ml/sec STP | 70 | 55 |

A series of experiments was performed with this apparatus at temperatures increased in stages from about 250° to 530° C. Measurements were taken of percentage oxygen consumed, the percentage of sulfur in the $H_2S$ which was converted to elemental sulfur (via reaction (3)), the amount of sulfur dioxide produced as a percentage of $H_2S$ consumed, and the percentage of $H_2S$ consumed (the latter measurements were performed only for Case 1). Analyses were performed by standard gas chromatography techniques.

Of these quantities, probably the most important is the oxygen consumption since this is the best measure of the effectiveness of the process.

FIG. 5 shows the oxygen consumption for Case 1 versus temperature for various reactor pressures. As can be seen from FIG. 5, at low pressures (5 psig) oxygen consumption rises from about 50 percent at 345° C. to about 100 percent at 410° C. As the system pressure is increased, oxygen utilization is substantially improved; at 100 psig pressure, oxygen consumption rises from about 50 percent at 290° C. to about 100 percent at 390° C. Higher system pressure therefore allows complete oxygen utilization at lower reactor temperature. Since the gases in a bubble reactor have approximately a constant residence time, independent of pressure at a given temperature, increased oxygen utilization is an indication that pressure increases the reaction rates. This was an unexpected and unforeseen result.

It was also demonstrated in the experiments, for Case 1, that a considerable amount of sulfur could be produced via reaction (3). Table 4 presents a typical performance at desirable conditions.

TABLE 4

Typical Outlet Gas Composition (Case 1)
(Mole %, Dry and Sulfur Free Basis)
(T = 390° C., p = 125 psig)

| | | | |
|---|---|---|---|
| $O_2$ | 0.007 | $O_2$ consumed | 99.9% |
| $N_2$ | 30.472 | $H_2S$ reacted | 71.3% |
| $CO_2$ | 60.580 | S produced | 57.4% |
| $H_2S$ | 6.147 | $SO_2$ generated | 25.8% |
| $SO_2$ | 2.380 | | |
| COS | 0.228 | | |
| $CS_2$ | 0.186 | | |

(S produced and $SO_2$ generated are expressed as % of inlet $H_2S$).

Figure 6:
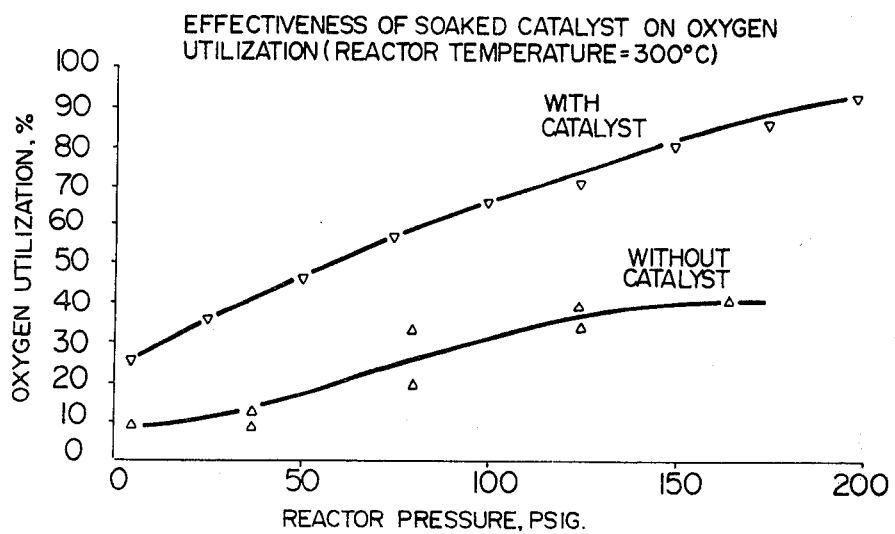
FIG. 6, which appears on the same drawing sheet as FIG. 4, shows graphically the effectiveness of soaked catalyst and liquid sulfur itself in promoting reaction (2) at 300° C. as a function of reactor pressure.

Experiments were also performed, for comparison, with the same apparatus without catalyst. As shown in FIG. 6, without the soaked catalyst in the bubble reactor, oxygen utilization at 300° C. was about 8 percent at 5 psig pressure, increasing to 40 percent at 200 psig. However, with catalyst in the reactor, the percent oxygen utilization was much higher under all conditions, starting out at 25 percent at 5 psig and increasing to over 90 percent at 200 psig. Furthermore, oxygen utilization increases at a faster rate with respect to pressure when soaked catalyst is present in the reactor. Similar results were also obtained using vanadium pentoxide as a catalyst.

Figure 7:
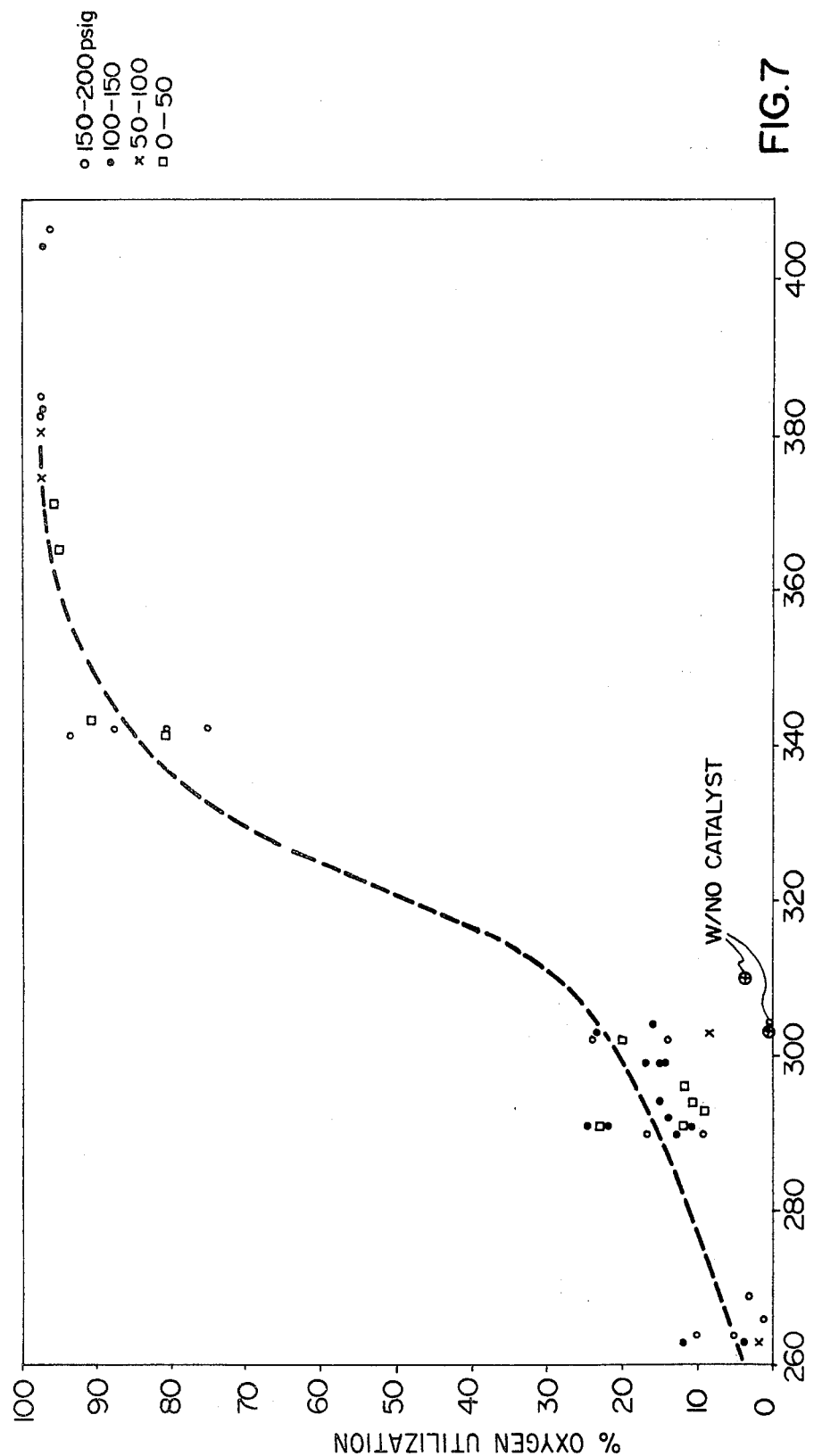
FIG. 7 depicts the following graphically for elemental sulfur oxidation:
 (a) soaked catalyst can effect oxygen utilization according to reaction (3A),
 (b) increasing efficiency for oxygen utilization with increasing temperature,
 (c) a minimum temperature above which substantially complete oxygen utilization is achieved.
Figure 8:
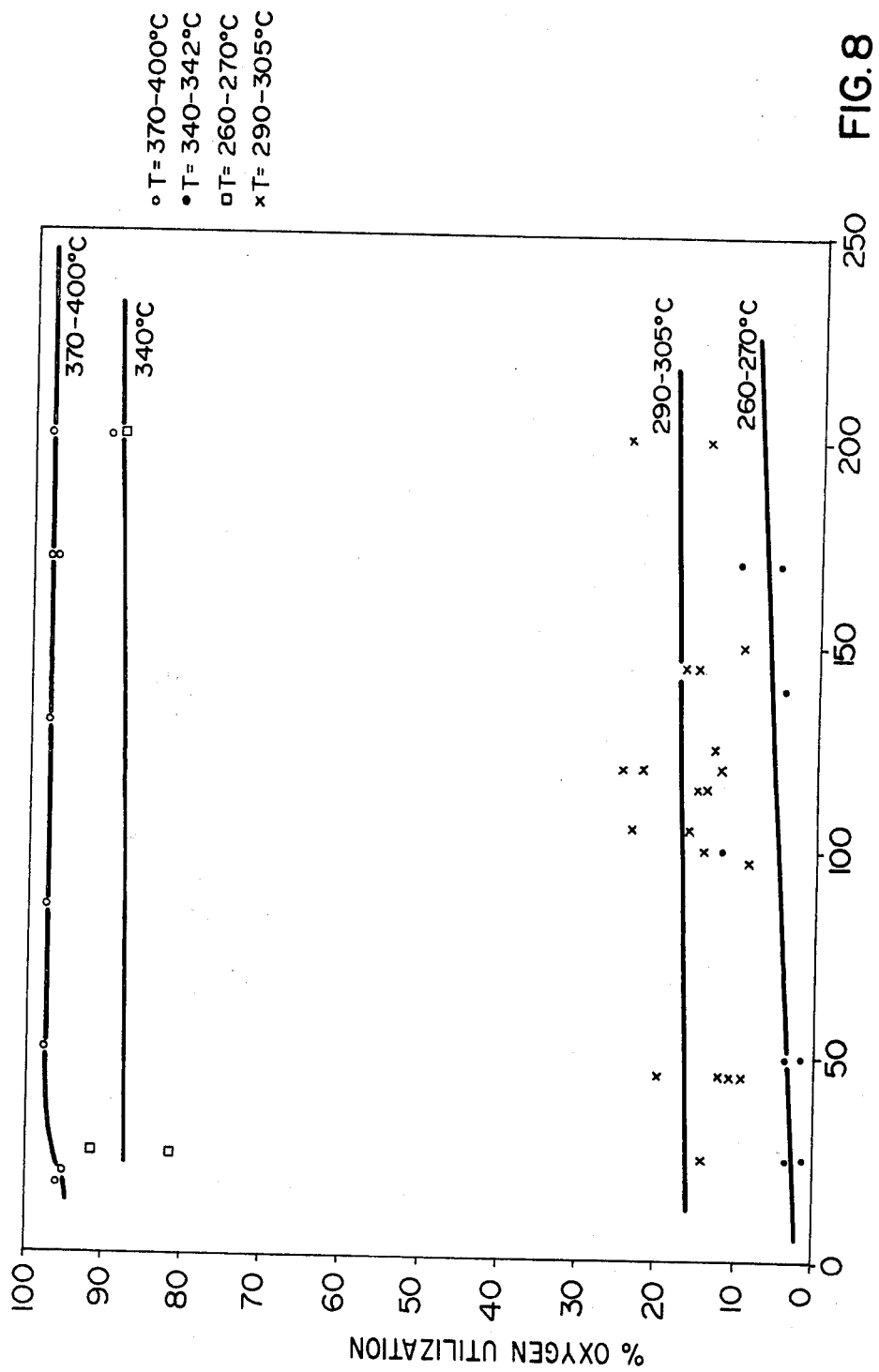
FIG. 8 is a graph showing the effectiveness of soaked catalyst in promoting reaction (3A) as a function of reactor pressure for several temperatures. The graph shows that oxygen utilization is substantially independent of system pressure.

As shown in FIG. 7, for Case 2—elemental sulfur oxidation—oxygen consumption rises from about 20 percent at 300° C. to about 100 percent at 400° C. As the system pressure is increased, oxygen utilization is substantially unaffected. FIG. 8 shows, in more detail, the independence of oxygen usage on system pressures. This behaviour is in sharp contrast to $H_2S$ oxidation (Case 1) and to $H_2S$, $SO_2$ reactions (3) which are improved by increasing pressure. However, this nondependence of yields on pressure can be taken as an independent proof that bubble reactors have gas phase residence times that are substantially independent of pressure.

FIG. 7 also shows two experimental results for the apparatus without any catalyst present. As in Case 1, it is evident that liquid sulfur itself exhibits some catalytic activity, but that it is not as effective as sulfur soaked catalyst.

Again the key parameter of process effectiveness is the consumption of oxygen. Table 5 presents a typical performance at desired conditions.

TABLE 5

Typical Outlet Gas Composition (Case 2)
(Mole %, Dry and Sulfur-Free Basis)
(T = 404° C., p = 130 psig)

| | | |
|---|---|---|
| $O_2$ | 0.286 | $O_2$ consumed = 97.8% |
| $N_2$ | 49.524 | |
| $CO_2$ | 36.178 | |
| $SO_2$ | 13.855 | |
| COS | 0.157 | |
| $CS_2$ | 0 | |

Sulfur trioxide in the outlet was undetectable by gas chromatographic analysis. Sulfate analysis of the activated alumina used in the Case 1 and Case 2 experiments indicated that the maximum increase of sulfate levels during the experimentation was about 0.2 percent w/w.

We claim:

1. A process for reacting hydrogen sulfide with oxygen comprising:
   continuously introducing a gas containing at least 1% hydrogen sulfide and an oxidizing gas containing free oxygen into a reactor which contains a bed of solid catalyst through which the said gases pass and which causes the hydrogen sulfide to react with oxygen to produce sulfur dioxide;
   maintaining all the catalyst continuously saturated with liquid sulfur during the reaction by continual injection and removal of liquid sulfur; and,
   maintaining and controlling within the reactor a temperature between about 275° and 550° C. and a pressure of at least 5 atmosphere absolute during the reaction.

2. A process for reacting hydrogen sulfide with oxygen comprising:
   continuously introducing a gas containing at least 1% hydrogen sulfide and substantially pure oxygen into a reactor which contains a bed of solid catalyst through which the said gases pass and which causes the hydrogen sulfide to react with oxygen to produce sulfur dioxide;
   maintaining all the catalyst continuously saturated with liquid sulfur during the reaction by continual injection and removal of liquid sulfur; and,
   maintaining and controlling within the reactor a temperature between about 275° and 550° C. during the reaction.

3. A process according to claim 1 or 2 wherein the system pressure is between 5 and 50 atm. absolute.

4. A process according to claim 1 or 2 wherein the catalyst is activated alumina or vanadium pentoxide.

5. A process according to claim 1 or 2 wherein the oxidizing gas is introduced into the catalyst bed at points dispersed both axially and radially within the reactor.

6. A process according to claim 1 or 2 wherein the hydrogen sulfide is introduced into the catalyst bed at points dispersed both axially and radially with the reactor.

7. A process according to claim 1 wherein the reactor is a bubble reactor with said catalyst bed being fixed and the amount of liquid sulfur in the reactor is regulated to maintain all of the catalyst soaked and submerged in liquid sulfur.

8. A process according to claim 1 wherein the reactor is a trickle-bed reactor with said bed being fixed and liquid sulfur is added to the top of the catalyst bed to maintain the catalyst soaked in liquid sulfur.

9. A process according to claim 8 wherein the flow of gases is co-current downward in the trickle-bed.

10. A process according to claim 1 wherein the hydrogen sulfide containing gas is acid gas.

11. A process according to claim 10 wherein the ratio of gases entering the reactor is controlled so that effluent gases from the reactor include hydrogen sulfide and sulfur dioxide in the ratio of 2:1 by volume.

12. A process according to claim 11, wherein the effluent gases containing hydrogen sulfide and sulfur dioxide are passed into a second reactor also containing a catalyst soaked with liquid sulfur and in which the conditions of temperature, pressure and residence time are such that the hydrogen sulfide and sulfur dioxide react to produce liquid sulfur and including the step of passing said produced liquid sulfur back into the first mentioned reactor.

13. A process according to claim 11 to produce sulfur and carbon dioxide wherein said hydrogen sulfide containing gas is an acid gas also containing carbon dioxide and said oxidizing gas is oxygen, and wherein the effluent gases are further reacted over a suitable catalyst to produce liquid sulfur and wherein the produced sulfur and water vapour thus produced are condensed and removed from the resulting gases to produce a gas containing substantial quantities of carbon dioxide.

14. A process according to claim 12 to produce sulfur and carbon dioxide wherein said hydrogen sulfide containing gas is an acid gas also containing carbon dioxide and said oxidizing gas is oxygen, and wherein the sulfur and water vapour in the effluent gases from the said second reactor are condensed and removed to produce a gas containing substantial quantities of carbon dioxide.

15. A process to produce sulfur and carbon dioxide according to claims 12 or 14 wherein the liquid sulfur and/or the water that are condensed after the said second reactor contain gases dissolved therein and said gases are recovered by either pressure reduction or heating or a combination thereof and wherein said gases are recycled to said first reactor for further processing and/or recovery.

16. A process according to claims 12, 13, or 14 wherein the acid gas has a hydrogen sulfide content between about 1 and 40 percent, the remaining major constituent being carbon dioxide.

17. Apparatus for producing sulfur from hydrogen sulfide, comprising:
   (a) a first reactor containing a first bed of catalyst capable of causing hydrogen sulfide to react with oxygen to produce sulfur dioxide,
   (b) means for supplying and compressing gases containing hydrogen sulfide and gases containing free oxygen to said first reactor,
   (c) means for delivering liquid sulfur to said first reactor to maintain the catalyst bed soaked with liquid sulfur and to control and maintain temperatures between about 275° to 550° C. in said first reactor,
   (d) means for removing liquid sulfur from the reactor,
   (e) a second reactor containing a second bed of catalyst which causes hydrogen sulfide and sulfur dioxide to react and produce elemental sulfur,
   (f) means for passing the sulfur dioxide produced from said first reactor together with hydrogen sulfide to said second reactor at a pressure of at least 5 atm absolute,
   (g) means for controlling the oxygen containing gas flow to said first reactor so that the inlet to said second reactor has a hydrogen sulfide/sulfur dioxide ratio of 2:1 (by volume),
   (h) means for cooling said second bed so that the conditions of temperature and pressure in the second bed allow the compressed hydrogen sulfide and sulfide dioxide to react to produce liquid sulfur in said second bed while free water therein exists only as water vapour, and
   (i) means for removing liquid sulfur from said second bed and for passing the liquid sulfur to said sulfur delivery means of said first reactor.

18. Apparatus according to claim 17 for producing sulfur and carbon dioxide from acid gas, wherein said means for supplying and compressing are arranged to pass acid gas to said first reactor, and wherein there are provided:
   (j) means for cooling effluent gases from said second reactor to condense sulfur and water,
   (k) means for removing liquid sulfur and water from said effluent gases,
   (l) means for degassing said liquid sulfur and water to recover dissolved gases, and
   (m) means for supplying said recovered gases back to said first reactor for further processing and recovery.

19. A process for producing sulfur from hydrogen sulfide comprising:
   continuously introducing a gas containing at least 1% hydrogen sulfide and an oxidizing gas containing free oxygen into a reactor which contains a bed of solid catalyst through which the gases pass and which causes the hydrogen sulfide to react with oxygen to produce sulfur dioxide, while controlling the ratio of gases entering the reactor so that effluent gases from the reactor include hydrogen sulfide and sulfur dioxide in the ratio of 2:1 by volume and while maintaining all the catalyst continuously saturated with liquid sulfur during the reaction and controlling the temperature within the reactor at between about 275° and 550° C. during the reaction; and,
   passing the effluent gases into a second reactor also containing a catalyst soaked with liquid sulfur and in which the conditions of temperature, pressure and residence time are such that the hydrogen sulfide and sulfur dioxide react to produce liquid sulfur the pressure in said second reactor being at least 5 atmospheres absolute, and including the step of passing said produced liquid sulfur back into the first mentioned reactor.

* * * * *